6866½X
J. S. Cram,
Cheese Press,
Patented Dec. 17, 1831.
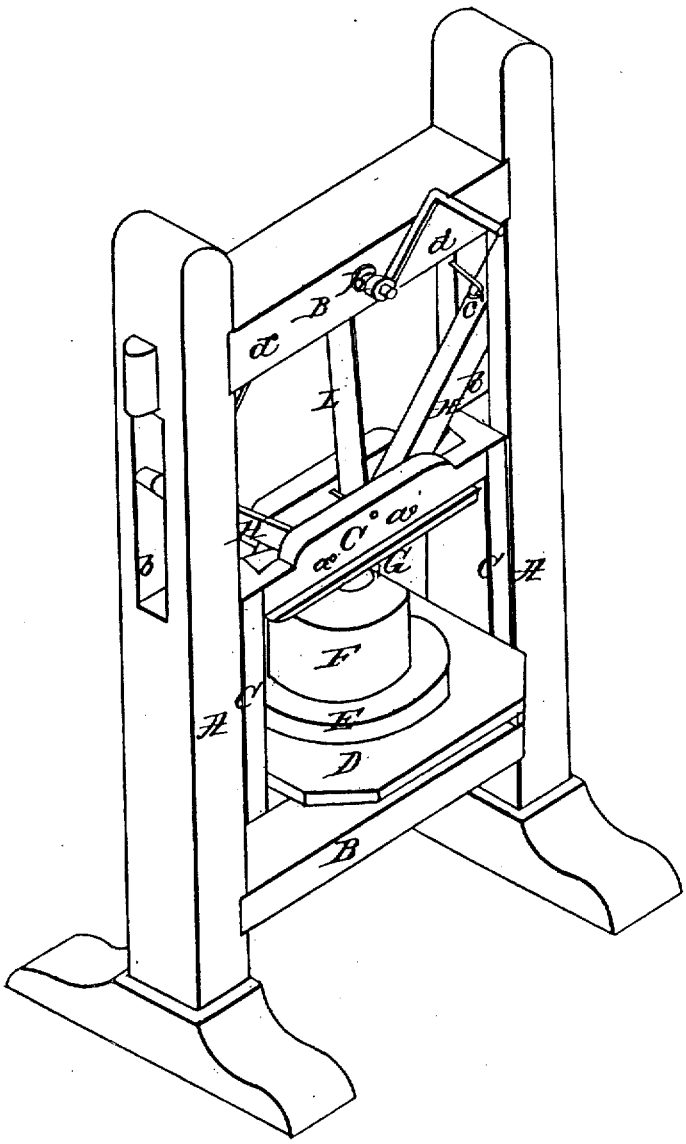
A.M. PHOTO-LITHO. CO. N.Y. (OSBORNE'S PROCESS)

Dec. 17. 1831

John S. Cram of Hanover. State of New Hampshire

Letters Patent.

The schedule referred to in these Letters Patent and making part of the
same containing a description in the words of the said John S. Cram
himself of his improvement called "Crams self pressing hanging lever Cheese
press." - To all to whom these presents shall come
Be it known that I John Shepard Cram, of Hanover in the
County of Grafton, and State of New Hampshire, have invented a new
and useful improvement for pressing Cheese and other substances, which
I call Crams self pressing hanging lever Cheese Press. and that the fol-
lowing is a full and exact description of the construction and operation of said Im-
-provement or machine as invented and improved by me, reference being had
to the drawing annexed which is to be considered a part of said description
and to the model deposited in the Patent Office.
The machine or improvement as used and applied to the pressing of Cheese
is constructed as follows: a frame of sufficient timber, consisting of two posts
five feet high or more or less fixed in timbers at the bottom so as to stand firm
as will be seen in the drawing annexed marked A, connected by a piece of
timber at top and bottom about three and an half feet long, said timbers
marked B. this is called the outer frame - a square frame of sufficient
timbers the side and top timbers of which are marked C. in the drawing, is to
be made just wide enough to slide up and down, between the post A. in a
groove fitted for the purpose in the said posts, this is called the inner frame
On the bottom piece of the inner frame, is placed a board, or under fol-
lower, marked D, on which the Cheese is placed. The top piece of said
inner frame is mortised out lengthways quite through, from upper to
under side almost the whole length of it. E. is the Cheese to be pressed
resting on the under board or follower D, F. is a block to be placed on top
of the Cheese. G is a beam of Wood laying horizontally just long enough
to play up and down within the inner frame, and kept in place by two pins one passing through each end, which pins are fixed in the upper timber of the inner frame. This beam G. lies on the block F. the levers marked H. are two hanging elbow levers attached to and passing through the top piece of the inner frame, secured by the pins a to M. top piece, said pins passing through the top piece and the levers near their lower end so as that the levers can play and forming the filcrum of the levers, the lower end of the levers resting on the beam G. the long or elbow ends of the levers pass through long mortises marked b. cut in the outside posts a. At the upper end of said levers at a joint marked c. the pieces that make the elbow pass through the same mortises marked b. in the posts a. to the top piece of the outer frame. and are secured to it at the dots d. where said elbows are attached to the levers at the joint. There are holes or staples placed, so that the short elbows may be fastened at different distances from the end of the levers as may be required. These elbows are to be of iron, brass or other rods of wood, or of cords as may be preferred by the person using. In the centre of the top piece of the outer frame is a mortise quite through from top to bottom, and through the top piece from front to back is placed a windlass marked K. and from the windlass a lether strap passes L. down to the upper beam of the inner frame by means of which the whole inner frame and its contents can be raised up at pleasure. The beam G. is attached to the lower ends of the levers H. by small leather straps to prevent the beam from falling when the cheise and block are taken from under it. By turning the windlass K. the whole inner frame is raised up — the cheese may be laid in its place for pressing with the block on it, the beam resting on the block and the lower ends of the levers resting on the beam. The inner frame is then suffered to slide down and the cheese is pressed by its own weight and that of the apparatus without the addition of any other power. The windlass is then turned — The inner frame raised, and the cheese can easily be removed. It is understood the proportions of the different parts of said machine may be varied at pleasure. — [illegible] November 2[illegible]th 182[illegible].

Witnesses
Chandler Metcalf
William Smith

John Shepard [illegible]